Patented May 28, 1940

2,202,247

UNITED STATES PATENT OFFICE 2,202,247

ADHESIVE

Paul B. Davidson, Wilkinsburg, Pa., and Julius R. Adams, Westfield, Mass., assignors to Old Colony Envelope Company, Westfield, Mass., a corporation of Massachusetts No Drawing. Original application April 18, 1935, Serial No. 17,128, now Patent No. 2,159,613, dated May 23, 1939. Divided and this application November 20, 1936, Serial No. 111,964

2 Claims. (Cl. 134—23.4)

This invention relates to improvements in adhesives and is directed more particularly to the type of adhesives which are applied to envelopes and the like and which are commonly called gums.

This application is a division of an application Serial No. 17,128 filed by us in the United States Patent Office on April 18, 1935, now Patent No. 2,159,613, dated May 23, 1939.

This invention has for its principal object the provision of an adhesive or gum which is and which remains sufficiently fluid for an ample length of time so that it may be readily and efficiently applied to the paper by the envelope machines. That is to say, the gums of this invention are so manufactured that the formation of objectionable starch pastes or jellies is prevented so that the machines can readily and properly apply the gum to the paper.

It is a further object of the invention to provide an adhesive or gum which will not react with the paper to form colored compounds. As an added advantage, our new adhesive may be manufactured at low cost.

In our co-pending application, Serial No. 17,129 filed by us on April 18, 1935, we have set forth a class of compounds which not only produce the desired fluidity in a dextrin gum but which do not react with protein material in the sizing of the paper to form colored humus-like compounds. These materials serve as fluidifying agents for the gum.

We have made the further discovery that there are other substances that, when present in the gum, not only impart to the gum the desired fluidity but also serve as plasticizers which prevent the gum from becoming hard and brittle. The use of these substances, which will hereinafter be referred to as fluidifying agents, in gums to prevent the development of discoloration and maintain the adhesive strength and fluidity of the gum is a major feature of the invention.

It has been hitherto common in the art to use sugars as an important ingredient of envelope adhesives in conjunction with partially dextrinized starch. We know that there has been adopted means to fluidify the mixtures and counteract the formation of starch pastes or jellies.

We have found that while the addition of sugar to the composition may successfully serve a gel-inhibiting function, such an adhesive is unsatisfactory for other reasons. That is to say, in the ordinary adhesive mixture containing water, starch and sugar, the sugar tends to crystallize when the gum is dried. This not only causes a loss of much of the gum's adhesive property but the sugar tends to react unfavorably with the protein-containing sizings in the paper and form discolored compounds.

We have discovered some adhesive compositions which are not only non-reactive with the protein-containing sizings in paper and which are at the same time gel-inhibiting but which will also not deteriorate with age. That is to say, our present invention consists of an adhesive comprising dextrin in combination with a novel fluidifying agent which is not only capable of inhibiting dextrin gel formation and incapable of combining with more or less of degraded protein to form colored or humus-like substances but which does not tend to become brittle or less cohesive when dried.

We have found that the discoloration occurs in the case of ordinary gums as a result of the chemical reaction between the sizing of the envelope paper and the reducing sugar formed in the hydrolysis of the starch, dextrin or sucrose. It was apparent to us that some fluidifying agent must be used which not only had the fluidifying and gel-inhibiting properties of sugar but which was incapable of unfavorable reacting with more or less degraded protein and of crystallizing to an objectionable extent.

Such substances as tend to accomplish this desired result are organic compounds of the water type, although preferably less volatile than water. That is, they not only have at least an affinity for water, but are capable of inhibiting dextrin gel formation and more or less plasticizing the composition. They are water-soluble ethers such as dioxan, methyl cellusolve and the like.

According to the preferred form of the method of this invention, water and partially dextrinized starch are mixed intimately. If desired, acetic acid may be introduced into the mixture and the mixture then agitated so that the ingredients thoroughly blend with one another.

The mixture is then heated in any well-known manner to within a range of preferably from 160° to 212° F. This temperature is preferably maintained for from 20 to 60 minutes. However, the length of time during which the gum is cooked depends of course on the size of the batch, the temperature, and the equipment used, it being desirable that the mixture be cooked at least until the hydrolysis of the starch to dextrin is complete. To this hot gum mixture the fluidifying agent is added. If desired, glycerine may also be added.

It is desired to here point out that we do not wish to be limited to any specific order in which the above ingredients may be added. It only is essential that the fluidifying agent be added to the composition at some time since it is the substances which are non-reactive with the protein-containing sizing of the paper that are important.

As final steps in the process the gum is preferably chilled to about 100° F., or below, after which the mixture is ready to be drawn.

The proportions of the above ingredients may be greatly varied but very favorable results have been obtained from the following proportions by weight:

| | Per cent |
|---|---|
| Water | 10 to 18 |
| Partially dextrinized starch | 50 to 62 |
| Fluidifying agent | 3 to 10 |

If acetic acid or some other volatile acid is added, about 10 to 20% thereof may be used. Or, if it is desired to include the glycerine or some other suitable plasticizing substance, about 4 to 10% may be used.

While we have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. As a new article of manufacture an adhesive of the class described comprising in combination, water, partially-dextrinized starch, and a fluidifying agent which renders the reducing sugars in the starch inactive, the agent consisting of a water-soluble ether.

2. As a new article of manufacture an adhesive of the class described comprising in combination, water, partially-dextrinized starch, and a fluidifying agent which renders the reducing sugars in the starch inactive, the agent consisting of dioxan.

PAUL B. DAVIDSON.
JULIUS R. ADAMS.